United States Patent [19]

Hosterman et al.

[11] 4,013,860
[45] Mar. 22, 1977

[54] HAND HELD ELECTRO-MECHANISM SEALER

[75] Inventors: Craig Hosterman, Paradise Valley; William E. Michel, Scottsdale; Dale R. Oldham, Phoenix, all of Ariz.

[73] Assignee: Engineering & Research Associates, Inc., Tucson, Ariz.

[22] Filed: Apr. 9, 1976

[21] Appl. No.: 675,235

[52] U.S. Cl. .......................... 219/10.81; 156/380; 219/10.77

[51] Int. Cl.² ...................... H05B 9/04; B32B 19/02

[58] Field of Search .......................... 156/380, 273; 219/10.81, 10.75, 10.77

[56] References Cited
UNITED STATES PATENTS

| | | | |
|---|---|---|---|
| 2,467,782 | 4/1949 | Schuman | 219/10.77 |
| 2,539,375 | 1/1951 | Snyder | 219/10.77 |
| 2,610,288 | 9/1952 | Cage | 219/10.77 |
| 2,820,875 | 1/1958 | Werych et al. | 219/10.75 |
| 3,232,810 | 2/1966 | Reesen | 156/273 |
| 3,783,217 | 1/1974 | Brown | 219/10.81 |

*Primary Examiner*—Douglas J. Drummond
*Attorney, Agent, or Firm*—Cahill, Sutton & Thomas

[57] ABSTRACT

A hand held sealer compresses and welds tubing intermediate a pair of jaws, which jaws also serve as the plates of a variable capacitor of an Rf resonant circuit. The flow of power intermediate the jaws generating the heat applied to accomplish the weld is a function of the spacing of the jaws, whereby the applied power is regulated to weld but not destructively melt the tubing.

14 Claims, 8 Drawing Figures

U.S. Patent  Mar. 22, 1977  Sheet 1 of 3  4,013,860
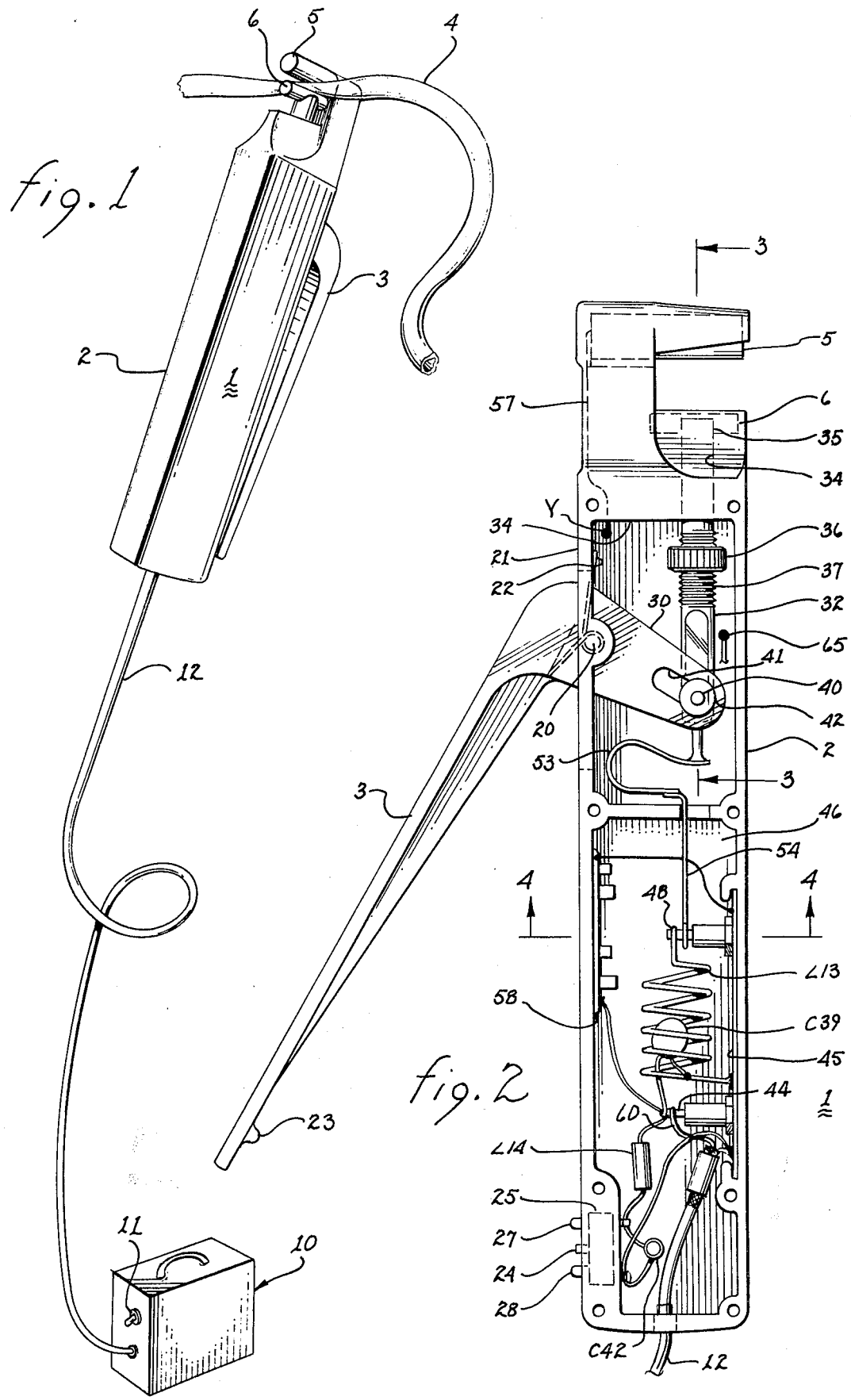

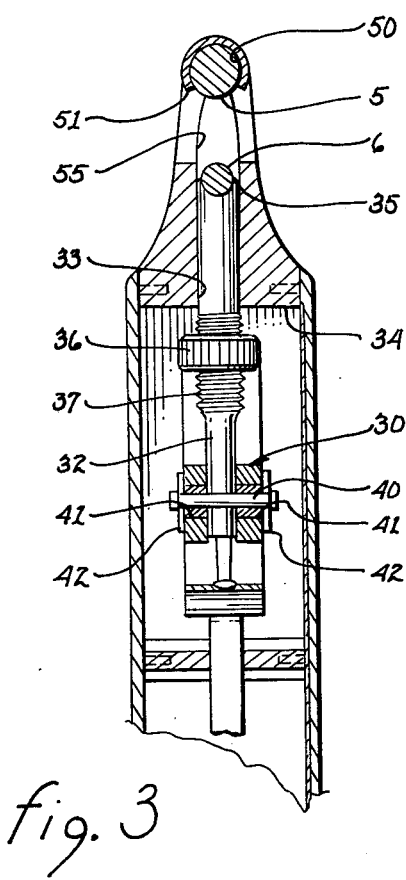
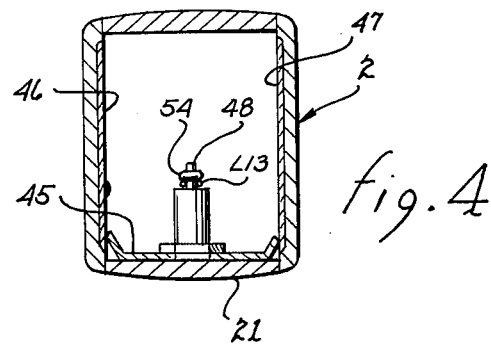
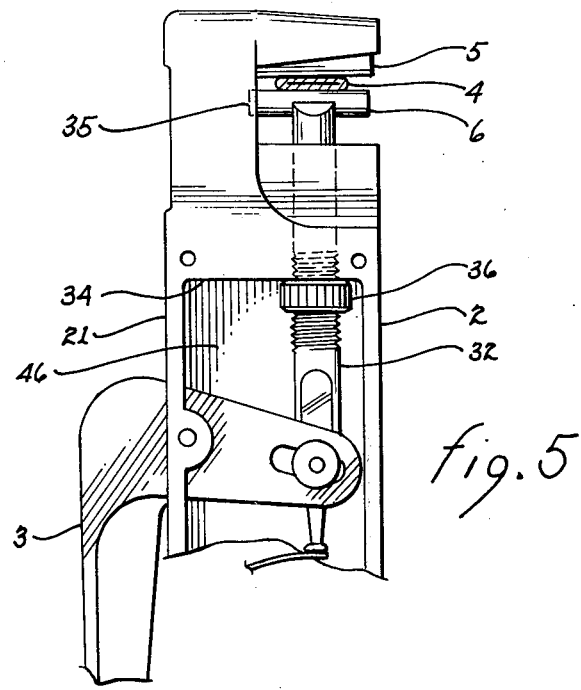
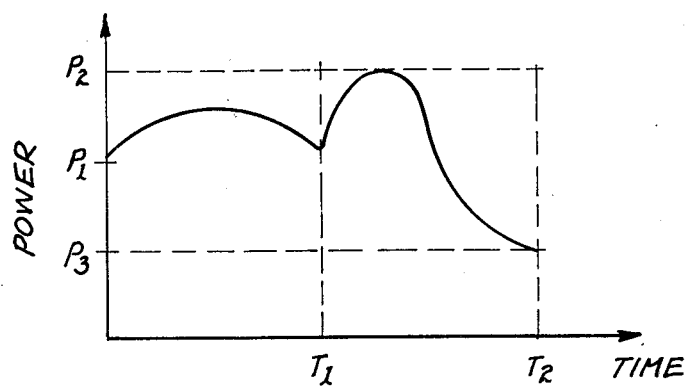

HAND HELD ELECTRO-MECHANISM SEALER

The present invention relates to sealers for plastic tubing and, more particularly, to hand held sealers for hermetically sealing tubing.

It is well known that plastic materials may be welded to one another by the application of heat. The prior art devices developed for this purpose are essentially immobile units particularly adapted for mass production requirements. The following U.S. patents are representative of these types of devices: U.S. Pat. No. 2,529,717, 2,629,809, 2,751,965, 3,040,153, 3,232,810, 3,518,396, 3,574,028, 3,632,943, and 3,738,892.

In 1966, U.S. Pat. No. 2,729,732 was granted which describes a hand held device which generates a high frequency electric field for dielectric heating of glue. In operation, the electrodes of the device are positioned upon opposed sides of dielectric material sandwiched together with glue. On actuation of the electric field, the glue becomes heated and, on cooling, bonds the materials to one another. The device also includes manually adjustable means for regulating the electric field commensurate with the dielectric materials and the glue. U.S. Pat. No. 3,238,346, is directed to a hand held device having a ring element for circumscribing abutting ends of plastic pipes. The device inductively heats the ring with the heat thereof being transferred to the plastic pipes to melt and fuse them.

In neither of the above described hand held devices is the amount of heat generated an automatically regulated function of the material to be heated or welded. Rather, the amount of heat to be applied is present and the quality of the bond being formed is primarily dependent upon the skill of the operator. Hence, neither of these hand held devices are satisfactorily useable by unskilled operators.

There is a continual existing need for blood donors in order to meet the day-to-day hospital demand for blood. Consequently, many private organizations, whether or not affiliated with hospitals, have arisen for the sole purpose of collecting blood. In order to obtain sufficient quantities of blood, these organizations must visit locations having a high concentration of blood donors. That is, they must periodically visit schools, office buildings, factories and the like and they must transport all equipment necessary to collect the donated blood.

Normally, the blood is drawn from a donor through flexible tubing extending into a plastic bag. Once the bag is filled to its capacity, the tubing must be sealed to prevent leakage and, more importantly, prevent deterioration of the collected blood. Because of the required mobility and rapid processing of a blood collection unit, any and all equipment required must be specifically designed for compact storage, minimum reliance upon support facilities at the blood collection location, minimum operating and set up times and ease of operability.

It is therefore a primary object of the present invention to provide a lightweight manually operated sealer for welding plastic tubing.

Another object of the present invention is to provide a self regulating sealer for plastic tubing.

Yet another object of the present invention is to provide a manually operated tube sealer for simultaneously mechanically compressing and electrically heating plastic tubing to establish a weld.

Still another object of the present invention is to provide a tube sealer which automatically shuts off the power on completion of a weld.

A further object of the present invention is to provide a manually operated tube sealer adaptable for use with different diameter and different wall thickness plastic tubing.

A yet further object of the present invention is to provide a manually operated tube sealer which is easily disassembleable for cleaning purposes.

A still further object of the present invention is to provide a manually operated tube sealer for plastic tubing wherein the amount of heat applied is a function of both the compression and the physical state of the plastic tubing.

These and other objects of the present invention will become apparent to those skilled in the art as the description thereof proceeds.

The present invention may be described with greater specificity and clarity with reference to the following figures, in which:

FIG. 1 illustrates a hand operated tube sealer and an accompanying power supply.

FIG. 2 is a cross-sectional view of the hand held tube sealer.

FIG. 3 is a cross-sectional view taken along lines 3—3, as shown in FIG. 2.

FIG. 4 is a cross-sectional view taken along lines 4—4, as shown in FIG. 2.

FIG. 5 is a detailed view of the mechanical elements effecting compression of the plastic tubing.

FIG. 7 is a graph depicting the power applied per time.

Figure 6:
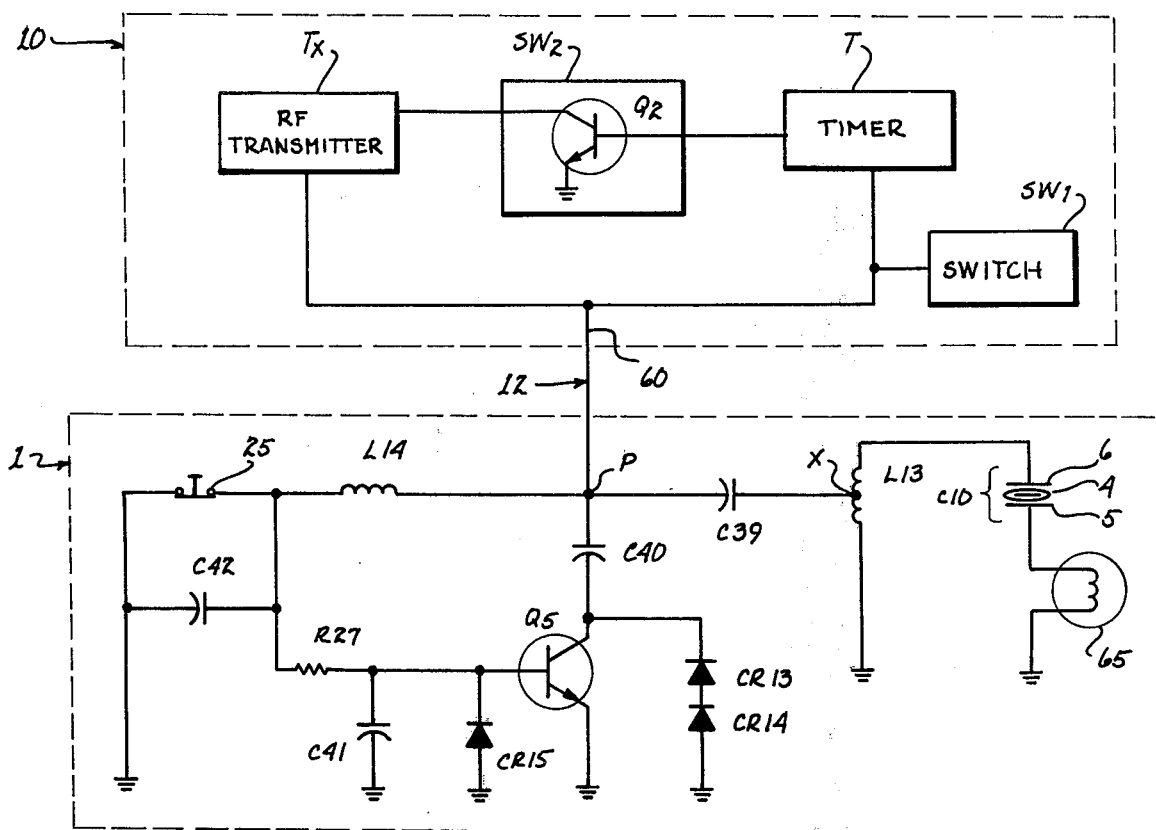
FIG. 6 and 6a are schematic diagrams of the operative elements of the electrical circuit.

Referring to FIG. 1, there is illustrated a tube sealer 1 electrically connected to a power supply 10 by an electrical cord 12. The tube sealer includes a body 2 having a pivotable somewhat flexible handle 3 extending therefrom. A length of plastic tubing 4 to be welded is positioned intermediate a fixed post and a movable post, hereinafter referred to as jaw 5 and jaw 6, respectively.

As described above, hand held tube sealer 1 was developed for the purpose of hermetically sealing the plastic tubing extending from a filled blood collection bag. To accomplish this goal, switch 11 of power supply 10 is switched to the ON position to provide power to the tube sealer. After insertion of tubing 4 intermediate jaws 5 and 6, handle 3 is drawn toward body 2, which movement causes jaw 6 to extend toward jaw 5 and partially compress the plastic tubing therebetween. Simultaneously, handle 3 actuates a switch to apply power in the form of Rf energy across jaws 5 and 6, which jaws serve as a variable capacitor of a resonant circuit. When the jaws are fairly far apart and contribute little capacitance to the resonant circuit, a pre-load capacitor in combination with the jaws brings the resonant circuit into sufficient tune to apply enough power to heat the tubing. The heat will soften the tubing and permit further movement of jaw 6 toward jaw 5. As the jaws approach one another, the increasing total capacitance of the resonant circuit will de-tune the circuit until a timer grounds the pre-load capacitor. The increasing capacitance of the physically repositioned jaws again increases the power applied up to a certain power level as the circuit again comes into tune. Thereafter, further movement of the jaws de-tunes the resonant circuit and the level of applied power decreases until the applied power is switched off by a timer. On termination of the applied power, or shortly therebefore, the jaws serve as a heat sink to draw heat from the tubing. The point at which the power is cut off coincides with the point at which the weld is established, whereafter handle 3 may be released to permit removal of tubing 4. Thus, the dual function of mechanical compression and dual step electrical heating is accomplished automatically by manually drawing handle 3 toward body 2.

The mechanical details of tube sealer 1 will be described with joint reference to FIGS. 2, 3, 4 and 5. Handle 3 is pivotally attached to body 2 by pivot means 20 mounted in proximity to surface 21 of the tube sealer. Spring means 22 is mounted to bias handle 3 into the extended position, as illustrated. A tip 23 extends from the extremity of handle 3 toward body 2 for engagement with plunger 24 of a miniature switch 25. Thereby, on drawing handle 3 toward body 2, tip 23 depresses plunger 24 and switches switch 25 from one state to another state. Ribs 27 and 28 are disposed on opposed sides of the extending part of plunger 24 and guard against inadvertant depressing of the plunger during normal handling of the tube sealer.

Arm 30 extends from handle 3 internal to body 2 and serves as one of the elements for effecting displacement of jaw 6 toward jaw 5. A rod 32 is journalled within a cylindrical passageway 33 extending through bulkhead 34. Arm 30 is clevis shaped such that an arm of the clevis is positioned on either side of a rod 32. A clevis pin 40 extends through the rod for engagement with each of slots 41 within the arms of the clevis. Retaining washers 42 or similar means ensures that the pin is retained in place. Jaw 5 is configured as a post and is mounted within a slotted cylindrical cavity 50. Slot 51 is oriented toward jaw 6 to expose the surface of jaw 5. Jaw 6, configured as a cylindrical post, is retained within a correspondingly configured channel 35 at the extremity of rod 32. A threaded thumb wheel 36 threadedly engages threaded section 37 of rod 32. By repositioning thumb wheel 36 along the rod, the repositioning of the rod toward jaw 5 is thereby limitable by the thumb wheel contacting bulkhead 34. Thus, the proximity of jaw 6 to jaw 5 can be readily and accurately controlled to be commensurate with the diameter and wall thickness of tubing 4.

In operation, as handle 3 is drawn toward body 2, arm 30 is pivoted forwardly, which action causes the edge of slots 41 to bear against clevis pin 40. The force exerted upon the clevis pin results in translatory motion of rod 32 within passageway 33 and movement of jaw 6 within channel 35 toward jaw 5 until further movement is constrained by thumb wheel 36 engaging bulkhead 34. As it is conceivable that pivotal movement of arm 30 may be restrained by thumb wheel 36 engaging bulkhead 34 prior to engagment of tip 23 with plunger 24, handle 3 must necessarily be flexible to to allow full travel of the extremity of the handle into contact with body 2. The flexibility of handle 3 also has another purpose. When the flexible tubing is initially positioned intermediate jaws 5 and 6, it, in a cool state, may be sufficiently rigid to preclude the full permissible movement of jaw 6. However, as handle 3 is sufficiently flexible to permit tip 23 to depress plunger 24 even though jaw 6 is not fully repositioned, power is applied across the jaws which tends to heat the plastic tubing and cause it to soften. Upon softening, the plastic tubing becomes more compressible, which compression will occur because of the flexed handle applying a bias upon arm 30 and ultimately exerting a force upon jaw 6 until the thumb wheel comes into contact with the bulkhead.

From FIG. 1, it may be noted that the side walls of body 2 are recessed intermediate jaws 5 and 6 to readily receive a length of plastic tubing for positioning intermediate the jaws. Moreover, an aperture 55 is disposed within surface 21 in proximity to the lower ends of jaws 5 and 6. This aperture permits ready cleaning in the event of rupture of the tubing being welded. Jaw 5 is also slidably removable from within cavity 50 for cleaning purposes.

The tube sealer is illustrated in the actuated position in FIG. 5. It may be noted that handle 3 is essentially parallel to surface 21 of body 2 which has caused rod 32 to be translated toward jaw 5 along its longitudinal axis. The translatory movement has been limited by thumb wheel 36 engaging bulkhead 34. In this position, tubing 4 has been compressed intermediate jaws 5 and 6 such that opposed inner surfaces thereof are in contact with one another.

Some of the details of the electrical elements mounted within hand gun 1 will be described with primary reference to FIGS. 2 and 4. Electrical current is supplied to the hand gun through conductor 60 of cord 12, assuming the cord to be a coaxial cable. Conductor 60 is electrically attached to an insulated post 44 (point Pin FIG. 6) and the grounded sheath of the coaxial cable is attached to a ground plane, such as copper sheet 45. The copper sheet is attached to the roof of the hand gun. It is in electrical contact with two further copper sheets 46, 47 disposed on the inside walls of the hand gun. These copper sheets also serve as a shield to contain the generated Rf energy within the hand gun. An inductor L14 interconnects post 44 with one terminal of normally closed switch 25; the other terminal is grounded to copper sheet 45. A capacitor C42 is connected across the switch terminals. An inductor L13 is electrically connected across copper sheet 45 and insulated post 48. A capacitor C39 interconnects post 44 with topped point X of indicator L13. Electrical power to jaw 6 is conveyed through an electrically conducting flexible strip 53 attached to rod 32 and extending from an electrically conducting bar 54 secured to post 48. A ground wire 57 extends from jaw 5 to electrically connect the jaw to copper sheet 46 at point Y (ground). A light 65, energizable in the presence of Rf energy is attached to copper sheet 46. The remaining circuit elements depicted in FIG. 6 may be mounted upon printed circuit board 58 or in a module attached to the inside surface of the hand gun.

Figure 6A:
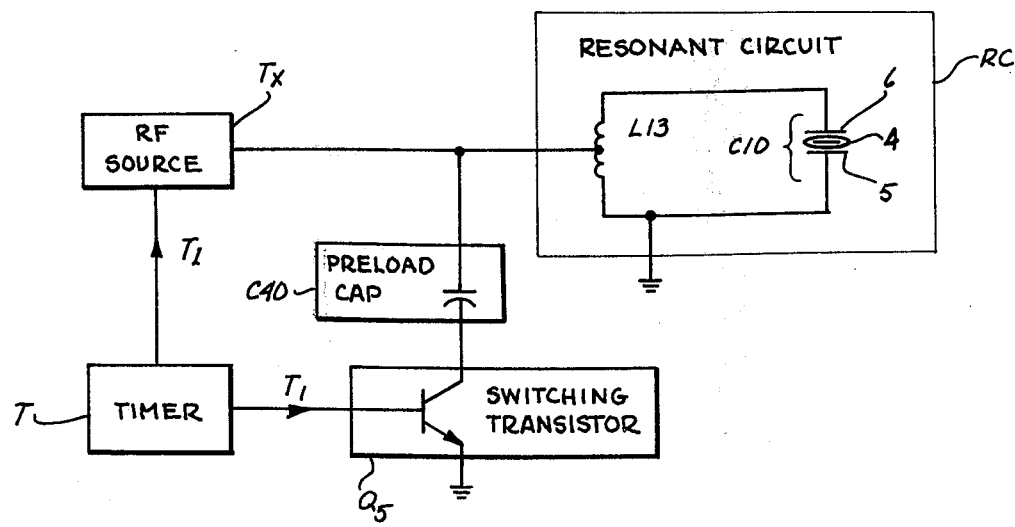

A simplified schematic diagram of the circuitry employed in the present invention is illustrated in FIG. 6 and a functional circuit diagram is illustrated in FIG. 6a. Power supply 10 (see FIG. 1) includes a timer T, a first electronic switch SW-1, a second electronic switch SW-2, and a high frequency (Rf) generator or transmitter TX. These components are electrically connected to the electronic components within hand gun 1 through cord 12, which cord is preferably a coaxial conductor having a shielded conductor 60.

The circuitry within hand gun 1 may be described with joint reference to FIGS. 2, 6 and 6a. Jaws 5 and 6 form the plates of a variable capacitor C10. This capacitor, in combination with inductor L13, form a resonant circuit RC. Capacitor C40 serves as a pre-load capacitance useful in preventing complete detuning of the resonant circuit when jaws 5 and 6 are spaced relatively far apart. Transistor Q5 is a switching transistor which grounds capacitor C40 to remove the pre-load capacitance when jaws 5 and 6 approach one another resulting in a corresponding increase in capacitance of capacitor C10 to bring the resonant circuit into tune. Inductor L14 is a DC coupling choke for coupling switch 25 to power supply 10 through conductor 60. Capacitor C42 is a contact bounce suppressor which eliminates multiple triggering that might otherwise occur due to contact bounce within switch 25. Resistor R27 is a current limiting resistor. Capacitor C41 is an Rf bypass capacitor and diodes CR13, CR14 and CR15 eliminate stray Rf energy within the circuit with diode CR15 also preventing the base electrode of transistor Q5 from going negative.

In operation, when handle 3 is drawn toward body 2 (see FIG. 1), switch 25 is opened. A DC voltage of approximately +10 volts is impressed upon point P from a voltage source within timer T. Simultaneously, an astable multi vibrator within timer T is triggered by the signal impressed upon conductor 60 and switch SW2 closes to actuate transmitter TX to supply Rf energy to the circuit within the hand gun. The applied power is represented by $P_1$ in FIG. 7. At this point, transistor Q5 is in saturation and capacitor C40 is grounded which puts a capacitive load on inductor L13 to compensate for the reduced capacitive effect of spaced apart jaws 5 and 6 serving as capacitor C10. The power flowing through plastic tubing 4 will tend to heat the tubing and cause it to become more readily compressible and permit jaw 6 to be brought closer and closer to jaw 5 in response to the pressure applied by handle 3. The applied power may peak and then diminish, as represented in FIG. 7, as the increasing capacitive effect of capacitor C10 tunes and de-tunes the resonant circuit.

After an interval of one second, $T_1$, timer T energizes switch SW-1, which switch grounds the DC voltage present at point P. The lack of a DC bias upon the gate electrode of transistor Q5 turns the transistor off and the capacitive pre-load supplied by C40 is no longer present. The eliminated capacitive contribution by capacitor C40 and the increasing capacitance of C10 due to the greater proximity between jaws 5 and 6, places the resonant circuit at or near the point of resonance and essentially full power, $P_3$, is supplied to the plastic tubing. As jaw 6 continues to approach jaw 5 under urging by handle 3, the capacitance will continue to increase with a corresponding increase in applied power until the resonant circuit becomes tuned ($P_2$) and then progressively detuned until the power drops to $P_3$. The level of power applied to the flexible tubing is a function of the tuned state of the resonant circuit. Thereby, the applied power is a function of the spacing between the jaws and is self regulating to the extent that if the tubing is heated to near its melting point, the jaws will readily approach one another resulting in a de-tuning of the resonant circuit and a reduction in the applied power. The application of reduced power will essentially preclude application of sufficient heat to melt and damage the tubing.

At the end of a second one second interval, $T_2$, timer T generate an output signal to switch SW2, which switch turns off transmitter TX.

An indicator light 65, which is responsive to Rf energy, provides a visual indication whenever power is applied to jaws 5 and 6. Thereby, the light will signal to an operator when the weld has been completed and at which time handle 3 may be released and the tubing removed.

It may be well to point out several subtleties of the circuit illustrated in FIG. 6. Should handle 3 be inadvertently or intermittently released so as to cause switch 25 to close and then reopen, the timing cycle will start anew. However, assuming that some softening of plastic tubing 4 will have occurred prior to release, the capacitive effect of capacitor C40 will remain for the full first second interval and in combination with the increased capacitance of C10 as jaws 5 and 6 are close to one another, will severely de-tune the resonant circuit. The de-tuned resonant circuit will permit only limited low level power to flow through the tubing. During the second one second interval, the resonant circuit will still be severely de-tuned and only low level power will be applied to the tubing. Hence, it is unlikely that sufficient heat will be generated to melt the tubing to the point of endangering rupture of the tubing.

By inspection, it will become apparent that the tube sealer is small sized, compact and lightweight. These factors render it useable at locations and with facility not available from any known prior art devices. As the length of cord 12 is essentially of no concern, the location of power supply 10 may be adjacent any readily available source of electrical energy and will not impede operation of the tube sealer.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:
1. A hand held sealer for sealing heat weldable tubing, said sealer having an electrically attached electrical power supply for generating Rf power, said sealer comprising in combination:
  a. a body for receiving the tubing;
  b. a pivotable handle for actuating operation of said sealer;
  c. a pair of jaws for compressing the tubing therebetween, one of said pair of jaws being positionably biased in response to pivotal movement of said handle;
  d. means disposed intermediate said handle and said one movable jaw for translating pivotal movement of said handle into translatory movement of said one movable jaw;
  e. resonant circuit means disposed within said handle for applying Rf power across the tubing compressed intermediate said pair of jaws, said resonant circuit including a variable capacitor developed by said pair of jaws for regulating the applied power by bringing said resonant circuit into and out of tune as the position of said one movable jaw varies;
  f. a pre-load capacitor electrically connected to said resonant circuit for developing an initial state of tune of said resonant circuit during initial compression of the tubing intermediate said pair of jaws, whereby said pre-load capacitor insures that suffi- cient flow of Rf power will occur across said pair of jaws to heat and soften the initially compressed tubing;

g. first switch means responsive to pivotal movement of said handle for electrically interconnecting said resonant circuit with the power supply;

h. timing means for generating a first electrical signal at the conclusion of a first time period and for generating a second electrical signal at the conclusion of a second time period;

i. second switch means responsive to said timing means for electrically disconnecting said pre-load capacitor from said resonant circuit at the conclusion of said first time period; and j. third switch means responsive to said timing means for electrically terminating the flow of Rf power from the power supply to said resonant circuit at the conclusion of said second time period;

whereby, the initial heating of the tubing during said first time period allows sufficient compression of the tubing by said pair of jaws to render the capacitive effect of said pair of jaws sufficient to bring said resonant circuit into tune during said second time period without the capacitance contributed by said pre-load capacitor and permit maximum power transfer across the tubing to establish a weld whereafter further movement of said pair of jaws de-tunes said resonant circuit to diminish the flow of power across the tubing and prevents rupture of the heated tubing.

2. The sealer as set forth in claim 1 wherein said translating means includes means for limiting the extent of movement of said one movable jaw.

3. The sealer as set forth in claim 2 wherein said limiting means comprises a thumb wheel.

4. The sealer as set forth in claim 3 wherein each of said pair of jaws comprises a cylindrical post.

5. The sealer as set forth in claim 4 wherein said cylindrical posts are of heat conductive material and serve as heat sinks during said second time period when said resonant circuit is de-tuned.

6. The sealer as set forth in claim 4 wherein the longitudinal axis of said posts is perpendicular to the longitudinal axis of said sealer.

7. The sealer as set forth in claim 1 wherein said handle includes a tit disposed at the end thereof for engaging and actuating said first switch means and wherein said handle is formed of flexible material to permit actuation of said first switch means by said tit without full translatory movement of said translating means.

8. The sealer as set forth in claim 1 including visible means responsive to the presence of Rf energy for indicating a flow of power intermediate said pair of jaws.

9. The sealer as set forth in claim 8 including shield means disposed within said body for limiting the transmission of Rf energy external to said sealer.

10. The sealer as set forth in claim 9 wherein said second switch means comprises an active semiconductor element.

11. A hand held sealer for sealing heat weldable tubing, said sealer comprising:

a. a source of Rf energy for heating the tubing;

b. a resonant circuit electrically connected to said source of Rf energy for heating and softening the tubing in proportion to the degree of tune of said resonant circuit;

c. a variable capacitor for varying the tune of said resonant circuit, said variable capacitor comprising a pair of jaws for compressing the tubing therebetween;

d. manually operated means for biasing one jaw of said pair of jaws toward the other jaw to compress the tubing between said pair of jaws and to vary the degree of tune of said resonant circuit;

e. a pre-load capacitor electrically connected to said resonant circuit for establishing an initial degree of tune of said resonant circuit on initial actuation of said biasing means; and f. switch means for removing said pre-load capacitor after initial compression of the tubing;

whereby, the tubing is initially heated and softened by the flow of Rf energy through the tubing to a degree sufficient to permit further movement of said pair of jaws toward one another and bring said resonant circuit into tune without the capacitive effect of said pre-load capacitor and resulting in a maximum flow of Rf energy through the tubing to establish a weld, whereafter yet further movement of said pair of jaws de-tunes said resonant circuit to limit the flow of Rf energy through the tubing and preclude destructive melting of the tubing.

12. The sealer as set forth in claim 11 including timing means for actuating said switch means to electrically disconnect said pre-load capacitor at the end of a predetermined time period.

13. The sealer as set forth in claim 12 including further switch means for electrically disconnecting said resonant circuit from said source of Rf energy and further timing means for actuating said further switch means.

14. The sealer as set forth in claim 13 including mechanical switch means responsive to movement of said biasing means for electrically connecting said resonant circuit with said source of Rf energy.

* * * * *